United States Patent [19]

Tanton et al.

[11] Patent Number: 4,818,881
[45] Date of Patent: Apr. 4, 1989

[54] HIGH-SENSITIVITY INFRARED POLARIMETER

[75] Inventors: George A. Tanton; John A. Grisham, both of Huntsville, Ala.

[73] Assignee: The United States of America as represented by the Secretary of the Army, Washington, D.C.

[21] Appl. No.: 51,872

[22] Filed: May 4, 1987

[51] Int. Cl.$^4$ ............................................. G01J 4/04
[52] U.S. Cl. ............................ 250/338.1; 356/367; 350/370
[58] Field of Search ........................... 250/338.1, 370; 356/367, 368

[56] References Cited

U.S. PATENT DOCUMENTS

| | | | |
|---|---|---|---|
| 2,976,764 | 3/1961 | Hyde et al. | 356/367 |
| 3,740,151 | 6/1973 | Chaney et al. | 356/368 |
| 4,048,500 | 9/1977 | Moore | 250/351 |
| 4,504,145 | 3/1985 | Koizumi | 356/368 |
| 4,585,348 | 4/1986 | Chastang et al. | 356/369 |

FOREIGN PATENT DOCUMENTS 55-24614  2/1980  Japan .................... 356/367

OTHER PUBLICATIONS

Dodel et al., "A Far-Infrared polar-Interferometer For Simultaneous Electron Density and Magnetic Field Measurements in Plasma", Infrared Physics, vol. 18, pp. 773–6.

Primary Examiner—Janice A. Howell
Assistant Examiner—John A. Miller
Attorney, Agent, or Firm—Freddie M. Bush; James T. Deaton; Hay Kyng Chang

[57] ABSTRACT

A sensitive infrared polarimeter that measures the amount of degree of rotation of the plane of polarization of plane polarized radiation after the radiation has passed through a wafer of cadmium sulfide. The wafer is placed in a relatively small magnetic field that is varied. Increased sensitivity is realized by using a chopping wheel to chop the laser beam, providing a reference frequency and by detecting the signals with a synchronous detector such as a lock-in amplifier to obtain high signal to noise ratios of the detected signal. The greater sensitivity of the high-sensitivity infrared polarimeter allows electronic carrier concentrations as low as $10^{15} cm^{-3}$ to be measured in cadmium sulfide with magnetic fields as low as 0.1 Tesla.

2 Claims, 1 Drawing Sheet

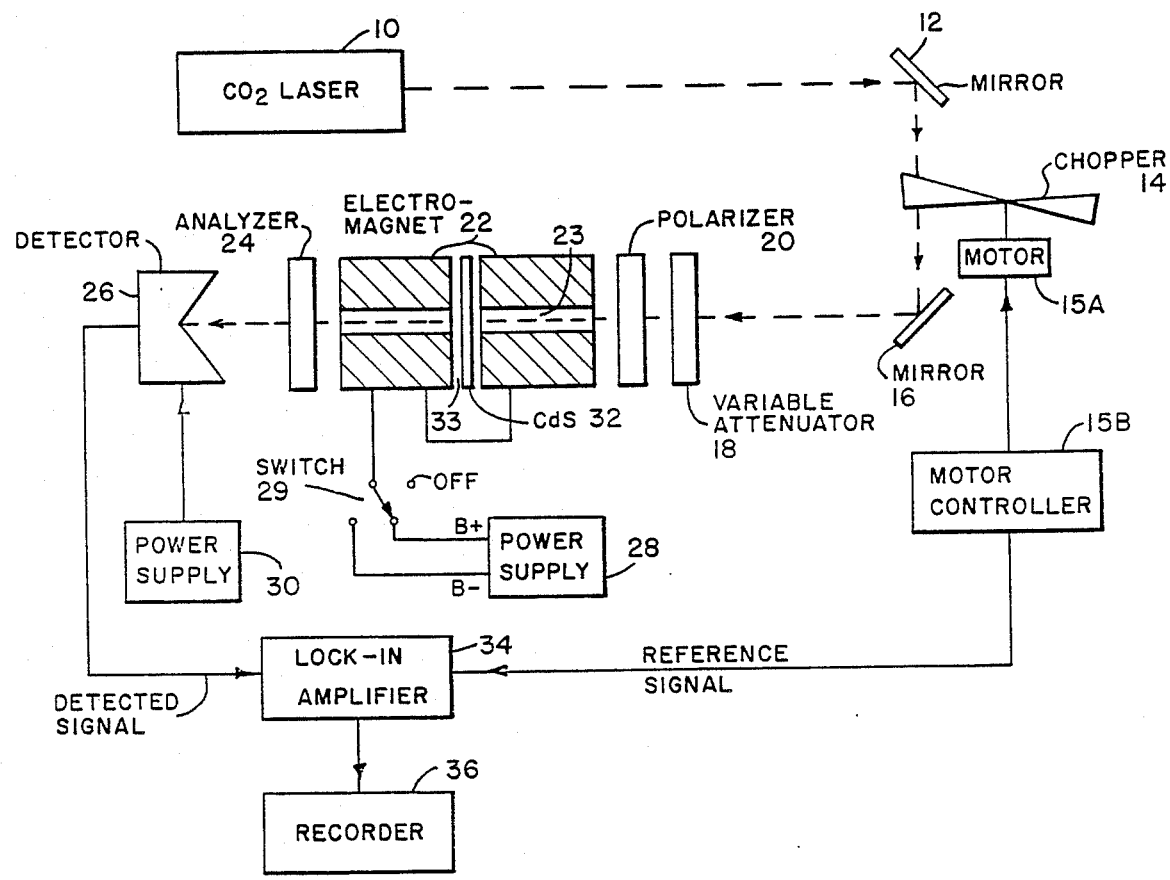

HIGH-SENSITIVITY INFRARED POLARIMETER

DEDICATORY CLAUSE

The invention described herein may be manufactured, used, and licensed by or for the Government for governmental purposes without the payment to us of any royalties thereon.

BACKGROUND OF THE INVENTION

Infrared polarimeters that utilize external magnets or electromagnets require extremely high magnetic fields. Typically, these magnetic fields are in the range of 5 to 10 Tesla. In addition to being expensive, this requires a relatively large scale of design and has a relatively low sensitivity.

SUMMARY OF THE INVENTION

An infrared polarimeter that measures the amount or degree of the rotation of the plane of polarization of plane polarized radiation after the radiation has passed through a cadmium sulfide (CdS) wafer. Relatively small magnetic fields are used to cause Faraday rotation and increased sensitivity is realized by using a chopping wheel to chop the laser beam, providing a reference frequency, and by using a synchronous detector to obtain high signal to noise ratios of the detected signal. As a result of greater sensitivity of the high-sensitivity infrared polarimeter, electronic carrier concentrations as low as $10^{15} cm^{-3}$ can be measured in cadmium sulfide with magnetic fields as low as 0.1 Tesla.

BRIEF DESCRIPTION OF THE DRAWING

The single FIGURE is a partial block diagram partial schematic of a high-sensitivity infrared polarimeter being used with a cadmium sulfide wafer.

DESCRIPTION OF THE PREFERRED EMBODIMENT

A $CO_2$ laser 10 is positioned to direct a beam of radiation of wavelength 10.6 microns and polarized in the horizontal plane onto a mirror 12. The laser beam is reflected from mirror 12 and is chopped at a very low frequency by a chopper 14. A typical low frequency chopping rate is 10 Hertz. The beam is then reflected from mirror 16 through a variable attenuator 18, a polarizer 20, the field of an electromagnet 22, and an analyzer 24 to a detector 26. Electromagnet 22 constitutes two split coils in coaxial arrangement. A hole is bored through the two coils so that the laser energy is directed through the bore 23. Electromagnet 22 was fabricated from two general purpose 115VAC, 6 watt, wire wound-iron core solenoids wired in series in a split gap configuration. When energized, the magnet develops a magnetic field necessary for causing Faraday effect in the gap 33 between the coils. A power supply 28 is coupled through a three position switch 29 to the electromagnet 22. The power supply-switch combination has an OFF, B+, and B− position so that either no voltage, a positive voltage, or a negative voltage 30 drives detector 26. Other power sources are not shown. With switch 29 turned off and power supply 30 turned on, there is no shift in the plane of polarization of radiation passing through the system. The intensity of radiation falling on the mercury-cadmium-telluride detector 26 is adjusted to the detector's operating level by rotating the variable attenuator 18, which is a standard wire grid polarizer. The beam of radiation leaving the variable attenuator passes through polarizer 20. The beam then passes through the bore 23 of electromagnet 22 that is centered on the beam. The cadmium sulfide single crystal 32 is positioned in gap 33 of the electromagnet so that one surface of the wafer intercepts the laser beam perpendicularly to the beam direction. The beam passes through the wafer and then through analyzer 24 before being directed onto detector 26. The output of detector 26 is coupled into a lock-in amplifier 34. Chopper 14 is driven by a motor 15A, which is controlled by motor controller 15B. Amplifier 34 also receives a reference signal from the chopper motor controller 15B. The output of lock-in amplifier 34 drives a strip chart recorder 36.

Detector 26 is a mercury-cadmium-telluride detector that only measures change in intensity and does not show phase shift directly. The reference signal from chopper motor controller 15B has a frequency proportional to the chopper speed. It is used by the lock-in amplifier (Synchronous Detector) to generate proper signal to noise for evaluation of detected signals. Analyzer 24 establishes the proper angle between plane of polarization of laser light on the wafer 32 and detector 26 for maximum changes in rotation attributed by the wafer. The power supply 28 is switched between B+ and B− only once per wafer.

After the initial adjustment with switch 29 turned off as described above, electromagnet 22 is energized when switch 29 is moved from the off position to either the B+ or B− position to apply power from power supply 28 to the electromagnet. When the switch is first placed in the B+ position, this places wafer 32 in an external magnetic field that is directed along the direction of the beam. The plane of polarization of the beam incident on wafer 32 is rotated by the interaction of the wafer material and the external magnetic field thus producing Faraday effect. The amount of rotation is detected as a decrease in intensity at detector 26, since the analyzer 24 and polarizer 20 are at a fixed angle of rotation with respect to each other and any rotation of the plane of polarization that occurs from the specimen will add to or subtract from that angle, resulting in a change in intensity as the beam leaves analyzer 24. The fixed angle between analyzer 24 and polarizer 20 is nominally 70 degrees. After the detector output has been amplified and recorded on recorder 36, the direction of the magnetic field is reversed by reversing the current flow through the magnet. This is done by switching switch 29 to the B− position. The difference in recorder reading when switch 29 is in the B+ and when it is B− position is proportional to the free carrier concentration in the wafer. This value is then used as a measure of the effects of these wafers on a beam of radiation impinging thereon and determine their respective variation from a desired standard. A plurality of wafers can be evaluated as acceptable or not acceptable for use in optical signal processing circuits such as in optical signal detectors for missile systems.

Although the present invention has been described with reference to a preferred embodiment, workers skilled in the art will recognize that changes may be made in form and detail without departing from the scope and spirit of foregoing disclosure. Accordingly, the scope of the invention should be limited only by the claims appended hereto.

We claim:

1. A high sensitivity infrared polarimeter comprising: a source of $CO_2$ laser radiation for generating a beam of radiant energy of wavelength of 10.6 microns along a beam path; an attenuator, a polarizer, a magnetic field generating means, an analyzer, said magnetic field generating means comprising an electromagnet having two coaxial coils for developing a magnetic field, said coils having coaxially aligned apertures therethrough, said apertures being positioned in said beam path such that any impinging radiation passes through the apertures in going from said polarizer to said analyzer, said two coaxial coils further having a space therebetween for individual placement within said space of a plurality of cadmium sulfide wafers; and a mercury-cadmium-telluride detector disposed in series alignment along the beam path so that impinging radiant energy is coupled sequentially from said source of radiation through said attenuator, polarizer, magnetic field generating means, and analyzer to terminate on said detector; beam directing means disposed in said beam path between said source of laser radiation and said attenuator for guiding the direction of said beam along said path; and interrupting means disposed on said beam path adjacent said directing means for selectively opening and closing said beam path to laser radiation traversing said path; driving means coupled to said magnetic field generating means for changing the electrical potential driving said magnetic field generating means, said driving means providing, selectively, a positive voltage, a negative voltage, or no voltage to said magnetic field generating means for controlling the degree and direction of an electromagnetic field within said apertures and the space between said coils.

2. A high sensitivity infrared polarimeter as set forth in claim 1 and further comprising recording means coupled to said detector for recording signals detected by said detector; said signals being indicative of the amount of Faraday rotation of the plane of polarization of plane polarized radiation passing through said cadmium sulfide wafers along said beam path.

* * * * *

UNITED STATES PATENT AND TRADEMARK OFFICE
CERTIFICATE OF CORRECTION

PATENT NO. : 4,818,881
DATED : April 4, 1989
INVENTOR(S) : George A. Tanton et al.

It is certified that error appears in the above-identified patent and that said Letters Patent is hereby corrected as shown below:

Column 1, line 60, before "30", insert -- may be coupled to drive magnet 22. A separate power supply --.

Signed and Sealed this

Fourteenth Day of November, 1989

*Attest:*

JEFFREY M. SAMUELS

*Attesting Officer*     *Acting Commissioner of Patents and Trademarks*